(12) United States Patent
Chiba et al.

(10) Patent No.: US 11,256,935 B2
(45) Date of Patent: *Feb. 22, 2022

(54) NOTIFICATION PROCESSING DEVICE

(71) Applicant: DENSO CORPORATION, Kariya (JP)

(72) Inventors: Kunihiko Chiba, Kariya (JP);
Michima Ogawa, Kariya (JP);
Tomohiro Miyachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/811,316

(22) Filed: Mar. 6, 2020

(65) Prior Publication Data
US 2020/0210728 A1  Jul. 2, 2020

Related U.S. Application Data

(63) Continuation of application No. 15/780,181, filed as application No. PCT/JP2016/085758 on Dec. 1, 2016, now Pat. No. 10,762,362.

(30) Foreign Application Priority Data

Dec. 1, 2015 (JP) .................................. 2015-234988

(51) Int. Cl.
*G06K 9/00* (2006.01)
*B60W 50/14* (2020.01)
(Continued)

(52) U.S. Cl.
CPC ............ *G06K 9/00818* (2013.01); *B60R 1/00* (2013.01); *B60W 30/14* (2013.01); *B60W 50/14* (2013.01);
(Continued)

(58) Field of Classification Search
CPC .... G06K 9/00818; G06K 9/6202; B60R 1/00; B60W 30/14; B60W 30/182; B60W 50/14;
(Continued)

(56) References Cited

U.S. PATENT DOCUMENTS 6,115,652 A  9/2000  Sato et al.
8,509,982 B2  8/2013  Montemerlo et al.
(Continued)

FOREIGN PATENT DOCUMENTS

JP  H10-320690  12/1998
JP  2005-004410  1/2005

*Primary Examiner* — Amir Alavi
(74) *Attorney, Agent, or Firm* — Maschoff Brennan

(57) ABSTRACT

A recognition unit recognizes a specific sign in a captured image acquired by an image acquisition unit. A first notification processing unit displays a specific captured image as a captured image showing the specific sign on a display device in a vehicle. A second notification processing unit provides a notification in a notification mode different from the display of the specific captured image. The recognition unit recognizes a start sign that is a sign indicating the start of an automatic driving permitted zone as a zone where running in an automatic driving mode is permitted, as the specific sign, in the captured image. When the recognition unit recognizes the start sign, the first notification processing unit displays on the display device a start captured image that is the captured image showing the start sign as the specific captured image. When the recognition unit recognizes the start sign, the second notification processing unit
(Continued)

notifies the start of the automatic driving permitted zone in a notification mode different from the display of the start captured image.

2 Claims, 10 Drawing Sheets

(51) Int. Cl.
*G05D 1/00* (2006.01)
*B60W 30/14* (2006.01)
*G08G 1/16* (2006.01)
*B60R 1/00* (2022.01)
*G01C 21/26* (2006.01)
*G01C 21/36* (2006.01)
*G06K 9/62* (2022.01)

(52) U.S. Cl.
CPC ......... *G01C 21/26* (2013.01); *G01C 21/3602* (2013.01); *G05D 1/0061* (2013.01); *G06K 9/6202* (2013.01); *G08G 1/16* (2013.01); *B60W 2050/143* (2013.01); *B60W 2050/146* (2013.01); *G05D 2201/0213* (2013.01)

(58) Field of Classification Search
CPC ............... B60W 50/082; B60W 50/08; B60W 2050/143; B60W 2050/146; G05D 1/0061
See application file for complete search history.

(56) References Cited

U.S. PATENT DOCUMENTS

| | | | |
|---|---|---|---|
| 9,443,426 B1 * | 9/2016 | Formwalt | G08G 1/09623 |
| 10,012,983 B2 * | 7/2018 | Seki | B60K 28/06 |
| 10,166,981 B2 * | 1/2019 | Horita | B60W 30/18163 |
| 10,248,873 B2 * | 4/2019 | Kozuka | B60R 1/00 |
| 10,331,127 B2 * | 6/2019 | Oba | G05D 1/0061 |
| 10,449,970 B2 * | 10/2019 | Urano | B60W 30/09 |
| 10,464,553 B2 * | 11/2019 | Miyahara | B62D 15/028 |
| 10,479,377 B2 * | 11/2019 | Nishida | G05D 1/0088 |
| 10,762,362 B2 * | 9/2020 | Chiba | B60W 30/14 |
| 10,930,153 B2 * | 2/2021 | Morimura | B60W 30/095 |
| 2015/0217763 A1 | 8/2015 | Reichel et al. | |
| 2016/0231743 A1 | 8/2016 | Bendewald et al. | |
| 2018/0074492 A1 | 3/2018 | Yamamoto et al. | |
| 2018/0170374 A1 | 6/2018 | Otsuka et al. | |
| 2018/0357496 A1 | 12/2018 | Chiba et al. | |
| 2019/0043362 A1 | 2/2019 | Morimura et al. | |
| 2019/0256108 A1 | 8/2019 | Emura et al. | |
| 2019/0270405 A1 | 9/2019 | Fukumoto | |
| 2019/0283742 A1 | 9/2019 | Kawabe et al. | |

* cited by examiner

NOTIFICATION PROCESSING DEVICE

CROSS-REFERENCE TO RELATED APPLICATION

This application is a continuation of U.S. application Ser. No. 15/780,181, filed on May 30, 2018, which claims priority to PCT Application No. PCT/JP2016/085758, filed on Dec. 1, 2016, which claims priority to Japanese Patent Application No. 2015-234988, filed on Dec. 1, 2015, in the Japan Patent Office, the entire disclosures of which is hereby incorporated by reference herein.

TECHNICAL FIELD

The present disclosure relates to a notification processing device for use in vehicles.

BACKGROUND ART

As a vehicle capable of automatic driving, PTL 1 discloses a vehicle that detects road signposts and road markings by an in-vehicle CCD camera, and automatically performs acceleration, braking, and steering among a driver's driving operations.

CITATION LIST

Patent Literature

[PTL 1] JP 10-320690 A

SUMMARY OF THE INVENTION

As this type of vehicle, there is a vehicle configured to be switchable in driving mode by a driver's operation between automatic driving mode and manual driving mode. The automatic driving mode is a driving mode in which automatic driving control is executed to automatically perform at least acceleration, braking, and steering among a driver's driving operations. The manual driving mode is a driving mode in which no automatic driving control is executed.

Such a vehicle may be used in running environments as described below, for example. That is, roads are divided into an automatic driving permitted zone where automatic driving is permitted and an automatic driving prohibited zone where automatic driving is prohibited. Start signs such as a road signpost and a road marking indicating the start of the automatic driving permitted zone are provided at the point of the start of the automatic driving permitted zone. When the vehicle enters from the automatic driving prohibited zone into the automatic driving permitted zone, the driver switches the driving mode from the manual driving mode to the automatic driving mode.

The inventor's studies have revealed that, under the foregoing circumstances, when the vehicle detects the start sign and notifies the driver of the start of the automatic driving permitted zone, the driver in receipt of the notification may not be able to switch the vehicle driving mode with a sense of security. Specifically, only with the notification through an in-vehicle speaker or the like during the driving of the vehicle that the vehicle has entered the automatic driving permitted zone, the driver may have to switch the driving mode while being still uncertain about the correctness of the notification.

One aspect of the present disclosure is to provide a technique for allowing the driver to switch the driving mode with a sense of security in the notification from the vehicle when the vehicle enters from the automatic driving prohibited zone into the automatic driving permitted zone.

One mode of the present disclosure is a notification processing device for providing a notification to a driver, which is used in a vehicle capable of running in an automatic driving mode and a manual driving mode. The automatic driving mode is a driving mode in which automatic driving control is executed to automatically perform at least acceleration, braking, and steering among the driver's driving operations. The manual driving mode is a driving mode in which no automatic driving control is executed. The notification processing device includes an image acquisition unit, a recognition unit, a first notification processing unit, and a second notification processing unit. The image acquisition unit acquires a captured image from an imaging device that captures the area ahead of the vehicle. The recognition unit recognizes a specific sign in the captured image acquired by the image acquisition unit. The first notification processing unit displays a specific captured image as the captured image showing the specific sign on a display device in the vehicle. The second notification processing unit makes a notification in a notification mode different from the display of the specific captured image. The recognition unit recognizes a start sign as the specific sign in the captured image acquired by the image acquisition unit. The start sign is a sign indicating the start of an automatic driving permitted zone as a zone where running in the automatic driving mode is permitted. When the recognition unit recognizes the start sign, the first notification processing unit displays on the display device a start captured image that is the captured image showing the start sign as the specific captured image. When the recognition unit recognizes the start sign, the second notification processing unit notifies the start of the automatic driving permitted zone in a notification mode different from the display of the start captured image.

In this configuration, when the recognition unit recognizes the start sign, the second notification processing unit makes a notification. In addition to this, the first notification processing unit displays the start captured image as the captured image showing the start sign on the display device. That is, the actual image of the start sign visibly recognizable to the driver is displayed on the display device during the driving of the vehicle. Then, the driver checks the displayed start captured image against the matter visibly identified by the driver. When there is a match between them, the driver can switch the driving mode of the vehicle to the automatic driving mode with certainty that the notification from the vehicle is correct. Therefore, the driver can switch the driving mode with a sense of security in the notification from the vehicle.

DESCRIPTION OF EMBODIMENTS

Embodiments for carrying out the disclosure will be described below with reference to the drawings.

1. Premises

Figure 1:
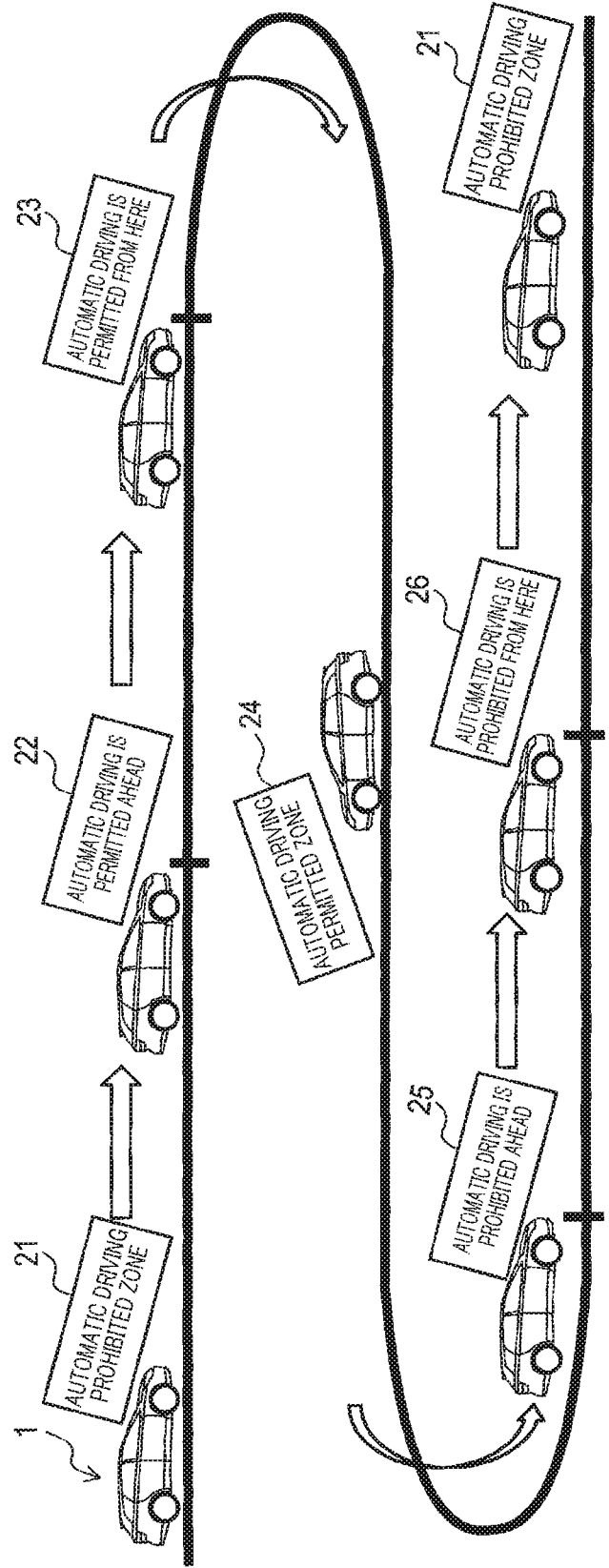
FIG. 1 is a diagram describing specific signposts recognized by a vehicle.

First, the matters as premises of an embodiment of the present disclosure will be described with reference to FIGS. 1 and 2. A vehicle 1 illustrated in FIGS. 1 and 2 can run in two driving modes, specifically, an automatic driving mode and a manual driving mode.

The automatic driving mode is a driving mode in which automatic driving control is executed to automatically perform at least acceleration, braking, and steering among a driver's driving operations. That is, in the automatic driving mode, acceleration, braking, and steering are performed without any need for the driver's operation. In contrast, the manual driving mode is a driving mode in which no automatic driving control is executed, that is, a normal driving mode.

Figure 2:
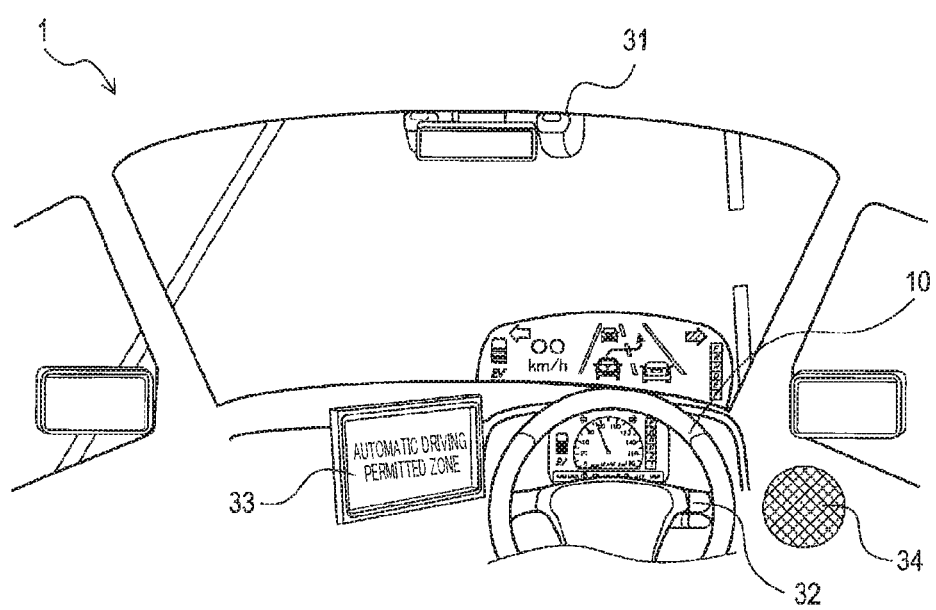
FIG. 2 is a diagram illustrating an interior of the vehicle.

In this embodiment, the driving mode is switched by the driver pressing a switch 32 on a steering wheel 10 of the vehicle 1 as illustrated in FIG. 2. That is, the driving mode is switched by the driver's operation.

In this embodiment, some roads are provided with an automatic driving permitted zone as a zone where automatic driving as running in the automatic driving mode is permitted. The zone other than the automatic driving permitted zone is an automatic driving prohibited zone where automatic driving is prohibited. As illustrated in FIG. 1, a start signpost 23 as a road signpost indicating the start of the automatic driving permitted zone is provided at the start position of the automatic driving permitted zone. An end signpost 26 as a road signpost indicating the end of the automatic driving permitted zone is provided at the end position of the automatic driving permitted zone. In this embodiment, the start signpost 23 is a road signpost with the message reading "Automatic driving is permitted from here". The end signpost 26 is a road signpost with the message reading "Automatic driving is prohibited from here".

A start announcement signpost 22 as a road signpost announcing beforehand the start of the automatic driving permitted zone is provided in the automatic driving prohibited zone before the start signpost 23. An end announcement signpost 25 as a road signpost announcing beforehand the end of the automatic driving permitted zone is provided in the automatic driving permitted zone before the end signpost 26. In this embodiment, the start announcement signpost 22 is a road signpost with the message reading "Automatic driving is permitted ahead". The end announcement signpost 25 is a road signpost with the message reading "Automatic driving is prohibited ahead".

A prohibition signpost 21 as a road signpost indicating the automatic driving prohibited zone is provided at some points in the automatic driving prohibited zone. A permission signpost 24 as a road signpost indicating the automatic driving permitted zone is provided at some points in the automatic driving permitted zone. In this embodiment, the prohibition signpost 21 is a road signpost with the message reading "Automatic driving prohibited zone". The permission signpost 24 is a road signpost with the message reading "Automatic driving permitted zone".

As described above, the prohibition signpost 21, the start announcement signpost 22, the start signpost 23, the permission signpost 24, the end announcement signpost 25, and the end signpost 26 are installed in this order on the road.

2. Configuration

Figure 3:
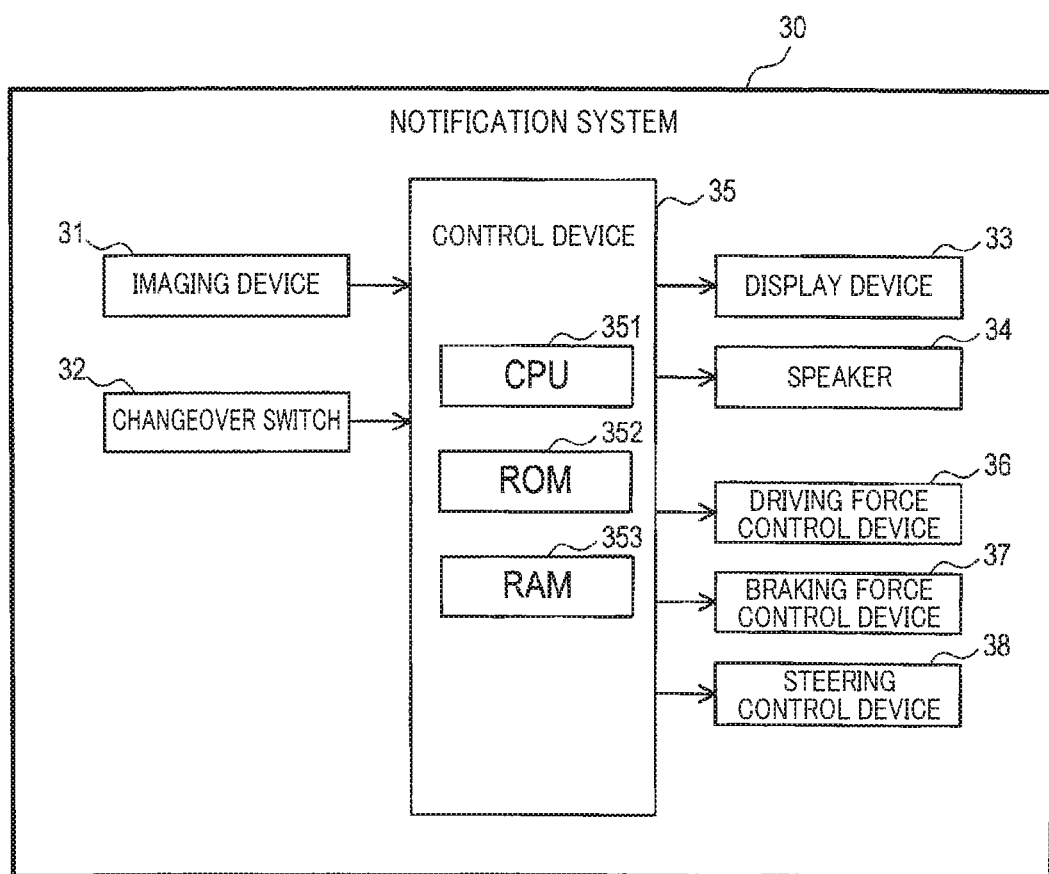
FIG. 3 is a block diagram illustrating a configuration of a notification system.
Figure 4:
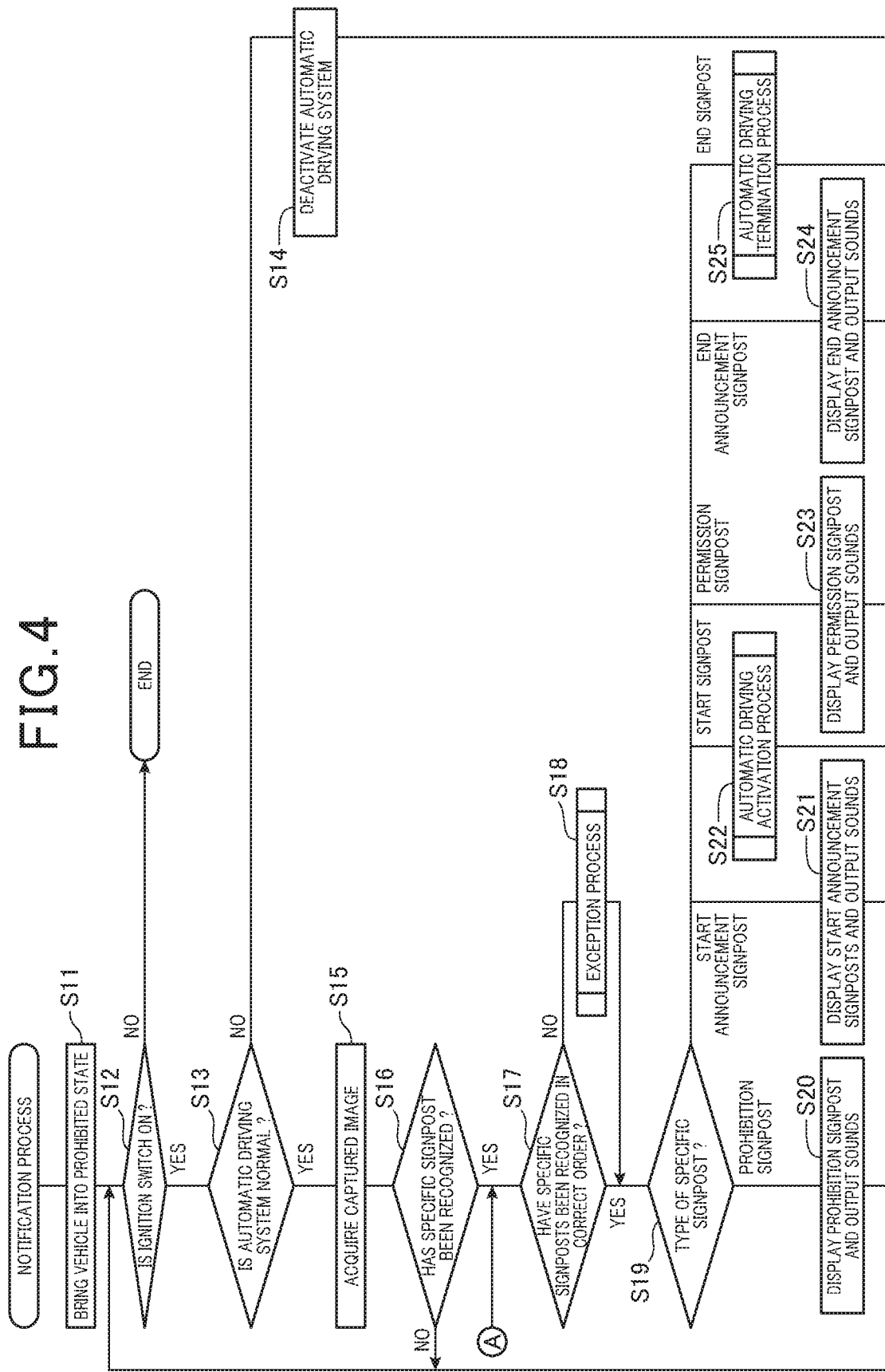
FIG. 4 is a flowchart of a notification process.

Next, a configuration of an embodiment of the present disclosure will be described. A notification system 30 illustrated in FIG. 3 is used in the vehicle 1. The notification system 30 includes an imaging device 31, a changeover switch 32, a display device 33, a speaker 34, a control device 35, a driving force control device 36, a braking force control device 37, and a steering control device 38.

The imaging device 31 is an in-vehicle camera that is provided at the front part of the vehicle 1, specifically, next to the rearview mirror in the vehicle interior as illustrated in FIG. 2. The imaging device 31 captures the area ahead of the vehicle 1 and outputs the captured image to the control device 35.

The changeover switch 32 is a switch for switching the driving mode of the vehicle 1 between the automatic driving mode and the manual driving mode.

The display device 33 is a device that can display images, that is, a display. The display device 33 is provided at a position where the driver can visually recognize the displayed image, specifically, on an instrument panel as illustrated in FIG. 2.

The speaker 34 is a device that can output sounds.

The control device 35 includes a microcomputer with a CPU 351, a ROM 352, a RAM 353, and the like. The control device 35 recognizes white lines, pedestrians, vehicles, and others based on the captured image acquired from the imaging device 31, and calculates a control amount for automatic driving. The control device 35 outputs the calculated control amount to the driving force control device 36, the braking force control device 37, and the steering control device 38.

The control device 35, specifically, the CPU 351 executes a notification process described later with reference to FIGS. 4 to 7, in accordance with programs recorded on the ROM 352 as a non-transitory tangible storage medium.

The driving force control device 36 controls the driving force based on the control amount input from the control device 35. The braking force control device 37 controls the braking force based on the control amount input from the control device 35.

The steering control device 38 performs steering control based on the control amount input from the control device 35.

3. Processing

Next, the notification process executed by the control device 35 will be described with reference to the flowcharts in FIGS. 4 to 7. The notification process is started by turning on an ignition switch of the vehicle 1. At a point in time when the ignition switch of the vehicle 1 is turned on, in other words, when the notification process is started, the driving mode of the vehicle 1 is set to the manual driving mode. In this embodiment, it is assumed that, at the startup of the vehicle 1, the vehicle 1 is positioned in the automatic driving prohibited zone.

In S11, the control device 35 brings the vehicle 1 into an automatic driving prohibited state. The automatic driving prohibited state here refers to a state in which the setting of the changeover switch 32 for switching the driving mode of the vehicle 1 from the manual driving mode to the automatic driving mode is deactivated. Other than the automatic driving prohibited state, the vehicle 1 has a permitted state in which the setting of the changeover switch 32 for switching the driving mode of the vehicle 1 to the automatic driving mode is activated. In this embodiment, the driving mode cannot be switched to the automatic driving mode from the instant when the vehicle 1 comes into the automatic driving prohibited state to the instant when the vehicle 1 enters the permitted state in S222 described later.

In S12, the control device 35 determines whether the ignition switch is on.

When it is determined that the ignition switch is on in S12, the control device 35 moves the process to S13. In contrast, when it is determined that the ignition switch is not on, that is, the ignition switch is off, the control device 35 terminates the notification process.

In S13, the control device 35 determines whether an automatic driving system is normal. The automatic driving system refers to sensors, ECUs, and actuators necessary for automatic driving. In this embodiment, the automatic driving system includes at least the imaging device 31, the driving force control device 36, the braking force control device 37, and the steering control device 38. In S13, the control device 35 determines the presence or absence of a failure in the automatic driving system. When there is a failure, the control device 35 determines that the automatic driving system is not normal. When there is no failure, the control device 35 determines that the automatic driving system is normal.

When it is determined that the automatic driving system is not normal in S13, that is, abnormal, the control device 35 moves the process to S14.

In S14, the control device 35 deactivates the operations of the automatic driving system. Specifically, when the driving mode is the manual driving mode, that is, no automatic driving is performed, the control device 35 deactivates the switching of the driving mode to the automatic driving mode so that the driving mode cannot be switched. In contrast, when the driving mode is the automatic driving mode, that is, automatic driving is performed, the control device 35 automatically runs the vehicle 1 to safe place such as a shoulder of the road and stops the vehicle 1 there, and then halts the operation of the automatic driving system.

After execution of S14, the control device 35 returns to S12 to repeat S12 and the subsequent steps.

In contrast, when it is determined that the automatic driving system is normal in S13, the control device 35 moves the process to S15.

In S15, the control device 35 acquires one latest captured image from the imaging device 31.

In S16, the control device 35 determines whether a specific signpost is recognized in the captured image acquired in S15. The specific sign here refers to a specific road signpost. In this embodiment, the specific signpost includes the prohibition signpost 21, the start announcement signpost 22, the start signpost 23, the permission signpost 24, the end announcement signpost 25, and the end signpost 26 illustrated in FIG. 1 and described above. In this embodiment, the control device 35 recognizes the specific signpost by template matching as well-known image processing.

When it is determined that no specific signpost is recognized in S16, the control device 35 returns to S12 to repeat S12 and the subsequent process. In contrast, when it is determined that the specific signpost is recognized, the control device 35 moves the process to S17.

In S17, the control device 35 determines whether the specific signposts have been recognized in the correct order. In this embodiment, at least S12 to 19 out of S12 to S25 are repeatedly executed. As a result, as the vehicle 1 runs, the specific signposts installed at intervals on the road are recognized in order. As described above, the specific signposts are installed on the road in the order of the prohibition signpost 21, the start announcement signpost 22, the start signpost 23, the permission signpost 24, the end announcement signpost 25, and the end signpost 26. When there is no inconsistency between the order of the specific signposts installed on the road and the order of the recognized specific signposts, the control device 35 determines that the specific signposts have been recognized in the correct order. In contrast, when there is an inconsistency, the control device 35 determines that the specific signposts have not been recognized in the correct order.

In a case with an inconsistency, for example, the specific signpost to be recognized earlier has not been recognized and thus the subsequent specific signposts have been recognized skipping the former specific signpost. The specific signpost to be recognized earlier may have not been recognized possibly because it has been hidden behind another vehicle and has not been captured.

The control device 35 determines that the specific signposts have been recognized in the correct order when the prohibition signpost 21 and the permission signpost 24 that can be consecutively installed have been consecutively recognized.

When it is determined that the specific signposts have been recognized in the correct order in S17, the control device 35 moves the process to S19. In contrast, when it is determined that the specific signposts have not been recognized in the correct order, the control device 35 executes an exception process described in FIG. 7 in S18, and then moves the process to S19. The exception process will be described later.

In S19, the control device 35 determines the type of the specific signpost recognized in S16.

When it is determined that the recognized specific signpost is the prohibition signpost 21 in S19, the control device 35 moves the process to S20.

In S20, the control device 35 displays a prohibition captured image as the captured image showing the recognized prohibition signpost 21 on the display device 33. The control device 35 also causes the speaker 34 to output sounds for indicating that the vehicle 1 is positioned in the automatic driving prohibited zone. For example, the control device 35 causes the speaker 34 to output the voice message saying "You are in the automatic driving prohibited zone".

In this embodiment, the specific captured image as the captured image showing a specific signpost such as the prohibition captured image is displayed on the display device 33 in a manner described below. That is, the control device 35 displays the captured image showing only a specific signpost as specific captured image on the display device 33. Specifically, in this embodiment, the imaging device 31 can capture an area including a specific signpost. The control device 35 first cuts a portion of the recognized specific signpost from the image captured by the imaging device 31. Then, the control device 35 enlarges and displays the cut image on the display device 33 in such a manner as to fill the display screen of the display device 33 as illustrated in FIG. 2. In this case, the control device 35 displays the cut image as a still image for a predetermined period of time (for example, several seconds).

After execution of S20, the control device 35 returns to S12 to repeat S12 and the subsequent steps.

Otherwise, when it is determined that the recognized specific signpost is the start announcement signpost 22 in S19, the control device 35 moves the process to S21.

In S21, the control device 35 displays a start announcement captured image as the captured image showing the recognized start announcement signpost 22 on the display device 33. The control device 35 also causes the speaker 34 to output the sounds for announcing beforehand the start of the automatic driving permitted zone. For example, the control device 35 causes the speaker 34 to output the voice message saying "Automatic driving area ahead".

After execution of S21, the control device 35 returns to S12 to repeat S12 and the subsequent steps.

Otherwise, when it is determined that the recognized specific signpost is the start signpost 23 in S19, the control device 35 moves the process to S22.

In S22, the control device 35 executes an automatic driving activation process.

Figure 5:
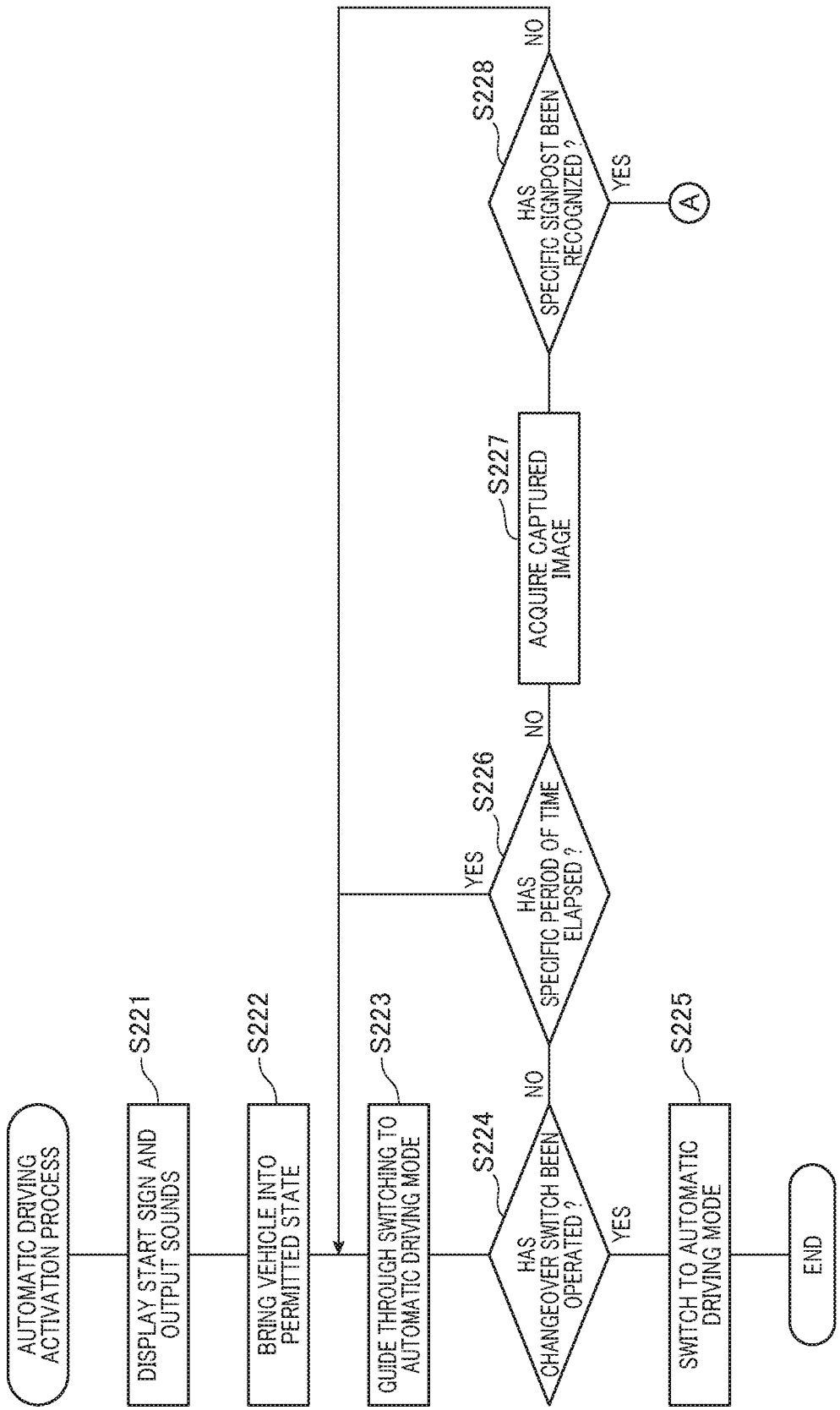
FIG. 5 is a flowchart of an automatic driving activation process executed as a part of the notification process.

The automatic driving activation process will be described with reference to the flowchart of FIG. 5.

In S221, the control device 35 displays a start captured image as a captured image showing the recognized start signpost 23 on the display device 33. The control device 35 also causes the speaker 34 to output the sounds for indicating the start of the automatic driving permitted zone. For example, the control device 35 causes the speaker 34 to output the voice message saying "Automatic driving area entered".

In S222, the control device 35 brings the vehicle 1 into the permitted state described above.

In S223, the control device 35 guides the driver in switching the driving mode to the automatic driving mode. For example, the control device 35 guides the switching method by causing the speaker 34 to output the voice message saying "Press the switch on the steering wheel".

In S224, the control device 35 determines whether the changeover switch 32 has been operated. When it is determined that the changeover switch 32 has been operated, the control device 35 moves the process to S225.

In S225, the control device 35 switches the driving mode to the automatic driving mode. After execution of S225, the control device 35 returns to S12 to repeat S12 and the subsequent steps.

In contrast, when it is determined that the changeover switch 32 has not been operated in S224, the control device 35 moves the process to S226.

In S226, the control device 35 determines whether a specific period of time has elapsed after the latest execution of S223, that is, after the latest guiding of the switching method. When it is determined that a predetermined period of time has elapsed, the control device 35 returns to S223 to repeat S223 and the subsequent steps. In contrast, when it is determined that no predetermined period of time has elapsed, the control device 35 moves the process to S227.

S227 and S228 are identical to S15 and S16 described above and descriptions thereof will be omitted.

When it is determined that no specific signpost has been recognized in S22, the control device 35 returns to S223 to repeat S223 and the subsequent steps. In contrast, when it is determined that a specific signpost has been recognized, the control device 35 returns to S17 to repeat S17 and the subsequent steps.

In contrast, when it is determined that the recognized specific signpost is the permission signpost 24 in S19, the control device 35 moves the process to S23.

In S23, the control device 35 displays a permission captured image as the captured image showing the recognized permission signpost 24 on the display device 33. The control device 35 also causes the speaker 34 to output the sounds for indicating that the vehicle 1 is positioned in the automatic driving permitted zone. For example, the control device 35 causes the speaker 34 to output the voice message saying "Automatic driving area entered".

After execution of S23, the control device 35 returns to S12 to repeat S12 and the subsequent steps.

Otherwise, when it is determined that the recognized specific signpost is the end announcement signpost 25 in S19, the control device 35 moves the process to S24.

In S24, the control device 35 displays an end announcement captured image as the captured image showing the recognized end announcement signpost 25 on the display device 33. The control device 35 causes the speaker 34 to output the sounds for announcing the end of the automatic driving permitted zone. For example, the control device 35 causes the speaker 34 to output the voice message saying "Automatic driving prohibited area ahead".

After execution of S24, the control device 35 returns to S12 to repeat S12 and the subsequent steps.

Otherwise, when it is determined that the recognized specific signpost is the end signpost 26 in S19, the control device 35 moves the process to S25.

In S25, the control device 35 executes an automatic driving termination process.

Figure 6:
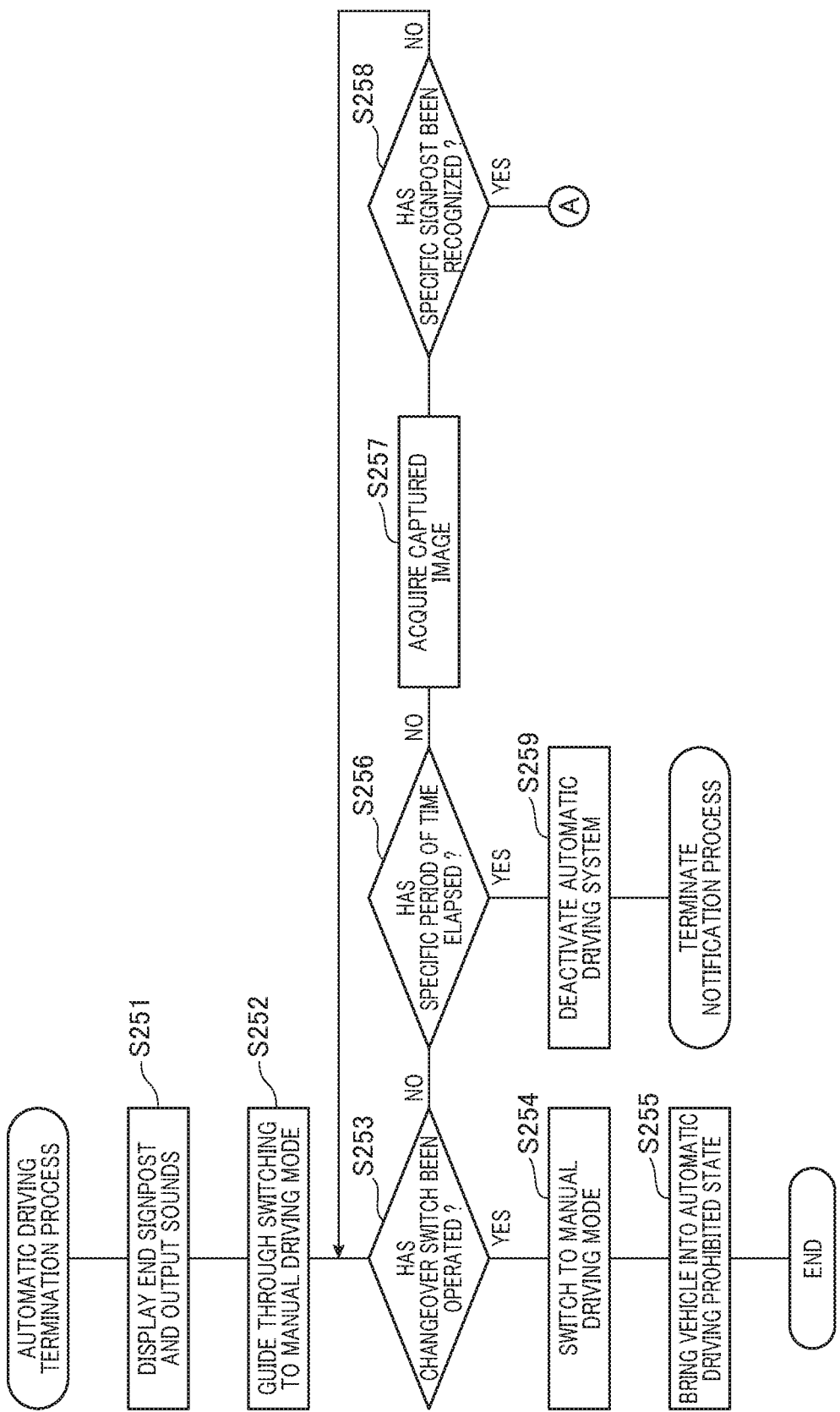
FIG. 6 is a flowchart of an automatic driving termination process executed as a part of the notification process.

The automatic driving termination process will be described with reference to the flowchart of FIG. 6.

In S251, the control device 35 displays an end captured image as the captured image showing the recognized end signpost 26 on the display device 33. The control device 35 also causes the speaker 34 to output the sounds for indicating the end of the automatic driving permitted zone. For example, the control device 35 causes the speaker 34 to output the voice message saying "Automatic driving is prohibited in this area".

In S252, the control device 35 guides the driver in switching the driving mode to the manual driving mode. For example, the control device 35 guides the switching method by causing the speaker 34 to output the voice message saying "Press the switch on the steering wheel".

In S253, the control device 35 determines whether the changeover switch 32 has been operated.

When it is determined that the changeover switch 32 has been operated in S253, the control device 35 moves the process to S254.

In S254, the control device 35 switches the driving mode to the manual driving mode.

In S255, the control device 35 brings the vehicle 1 into the automatic driving prohibited state described above. After execution of S255, the control device 35 returns to S12 to repeat S12 and the subsequent steps.

In contrast, when it is determined that the changeover switch 32 has not been operated in S253, the control device 35 moves the process to S256.

S256, S257, and S258 are identical to S226, S227, and S228 described above and descriptions thereof will be omitted.

When it is determined that no specific signpost has been recognized in S258, the control device 35 returns to S252 to repeat S252 and the subsequent steps. In contrast, when it is determined that a specific signpost has been recognized, the control device 35 returns to S17 to repeat S17 and the subsequent steps.

When it is determined that a predetermined period of time has elapsed in S256, the control device 35 moves the process to S259.

In S259, the control device 35 executes the same operation as in S14. That is, the control device 35 automatically drives the vehicle 1 to a safe place such as a shoulder of a road and stops the vehicle 1 there, and then halts operation of the automatic driving system. Accordingly, in this embodiment, continuous automatic driving of the vehicle 1 in the automatic driving prohibited zone is prevented. After execution of S259, the control device 35 terminates the notification process.

Figure 7:
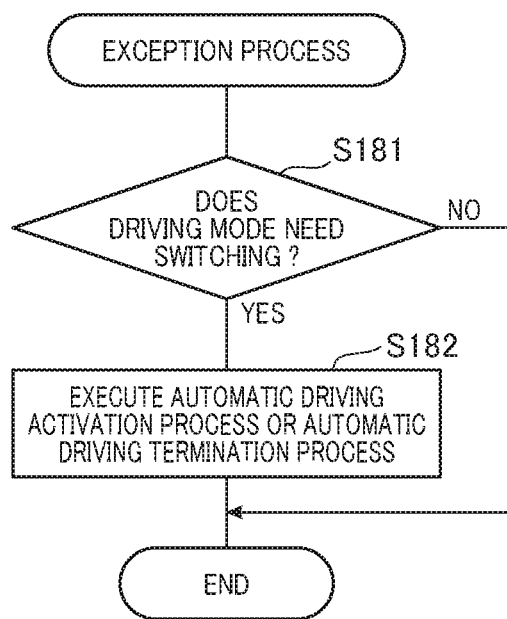
FIG. 7 is a flowchart of an exception process executed as part of the notification process.

Next, the exception process executed in S18 will be described with reference to the flowchart of FIG. 7.

In S181, the control device 35 determines whether there is the need to switch the driving mode. In this embodiment, the control device 35 determines that the driving mode needs to be switched in any one of the following cases (1) to (5):

(1) Following the recognition of the prohibition signpost 21, any one of the start signpost 23, the permission signpost 24, and the end announcement signpost 25 is recognized.

(2) Following the recognition of the start announcement signpost 22, the permission signpost 24 or the end announcement signpost 25 is recognized.

(3) Following the recognition of the start signpost 23 or the permission signpost 24, any one of the end signpost 26, the prohibition signpost 21, and the start announcement signpost 22 is recognized.

(4) Following the recognition of the end announcement signpost 25, the prohibition signpost 21 or the start announcement signpost 22 is recognized.

(5) Following the recognition of the end signpost 26, any one of the start signpost 23, the permission signpost 24, and the end announcement signpost 25 is recognized.

More specifically, the control device 35 determines that the driving mode needs to be switched to the automatic driving mode in the cases (1), (2), and (5). The control device 35 determines that the driving mode needs to be switched to the manual driving mode in the cases (3) and (4).

When it is determined that the driving mode needs to be switched in S181, the control device 35 moves the process to S182.

In S182, the control device 35 executes the automatic driving activation process or the automatic driving termination process. When it is determined that the driving mode needs to be switched to the automatic driving mode in S181, the control device 35 executes the automatic driving activation process described above with reference to FIG. 5. In contrast, when it is determined that the driving mode needs to be switched to the manual driving mode in S181, the control device 35 executes the automatic driving termination process described above with reference to FIG. 6. When executing the automatic driving activation process in S182, the control device 35 does not display the start captured image on the display device 33 but executes the output of sounds from the speaker 34 in S221. Similarly, when executing the automatic driving termination process in S182, the control device 35 does not display the start captured image on the display device 33 but executes the output of sounds from the speaker 34 in S251.

After execution of S182, the control device 35 terminates the exception process.

4. Example of a Running Scene

Next, an example of a running scene from a viewpoint of the driver will be described.

First, in the automatic driving prohibited zone, the driver runs the vehicle 1 in the manual driving mode until the appearance of the start announcement signpost 22. Then, the driver prepares for switching the driving mode to the automatic driving mode in the section between the start announcement signpost 22 and the start signpost 23 in the automatic driving prohibited zone, that is, before the automatic driving permitted zone.

In the whole automatic driving prohibited zone, the driver visually checks the system status of the vehicle 1 and the presence or absence of specific signposts around the vehicle 1, specifically, the presence or absence of the prohibition signpost 21, the start announcement signpost 22, and the start signpost 23. The driver may run in the automatic driving prohibited zone, for example, from the driver's house to the automatic driving permitted zone.

In the vicinity of the installation position of the start signpost 23, the driver checks whether there is a match between the start captured image displayed on the display device 33 and the start signpost 23 visually identified by the driver. Then, the driver switches the driving mode to the automatic driving mode. At that time, the driver checks the surroundings of the vehicle 1 before switching the driving mode.

In the automatic driving permitted zone, the driver visually checks the system status of the vehicle 1 and the presence or absence of specific signposts around the vehicle 1, specifically, the presence or absence of the permission signpost 24, the end announcement signpost 25, and the end signpost 26.

The driver prepares for switching the driving mode to the manual driving mode in the section between the end announcement signpost 25 and the end signpost 26 in the automatic driving permitted zone, that is, before the automatic driving prohibited zone.

In the vicinity of the installation position of the end signpost 26, the driver checks whether there is a match between the end captured image displayed on the display device 33 and the end signpost 26 visually identified by the driver. Then, the driver switches the driving mode to the manual driving mode. At that time, the driver checks the surroundings of the vehicle 1 before switching the driving mode.

5. Advantageous Effects

According to this embodiment described above in detail, the following advantageous effects can be obtained:

(5a) In this embodiment, when the start signpost 23 is recognized in the acquired captured image, the control device 35 displays the start captured image on the display device 33. The control device 35 also causes the speaker 34 to output the sounds to notify the start of the automatic driving permitted zone.

In this embodiment, the actual image of the start signpost 23 visually recognizable to the driver is displayed on the display device 33 during the driving of the vehicle. Accordingly, when there is a match between the displayed start captured image and the matter visibly identified by the driver, the driver can switch the driving mode of the vehicle to the automatic driving mode with certainty that the notification from the vehicle is correct. Therefore, the driver can switch the driving mode with a sense of security in the notification from the vehicle.

(5b) In this embodiment, when the end signpost 26 is recognized in the acquired captured image, the control device 35 displays the end captured image on the display device 33. The control device 35 also causes the speaker 34 to output the sounds to notify the end of the automatic driving permitted zone.

Accordingly, when there is a match between the end captured image displayed on the display device 33 and the matter visibly identified by the driver, the driver can switch the driving mode of the vehicle to the manual driving mode with certainty that the notification from the vehicle is correct.

(5c) In this embodiment, when the start announcement signpost 22 is recognized in the acquired captured image, the control device 35 displays the start announcement captured image on the display device 33. The control device 35 also causes the speaker 34 to output the sounds to announce beforehand the start of the automatic driving permitted zone.

Accordingly, when there is a match between the start announcement captured image displayed on the display device 33 and the matter visibly identified by the driver, the driver can switch to the automatic driving mode before the automatic driving permitted zone with certainty that the notification from the vehicle is correct.

(5d) In this embodiment, when the end announcement signpost 25 is recognized in the acquired captured image, the control device 35 displays the end announcement captured image on the display device 33. The control device 35 also causes the speaker 34 to output the sounds to announce beforehand the end of the automatic driving permitted zone.

Accordingly, when there is a match between the end announcement captured image displayed on the display device 33 and the matter visibly identified by the driver, the driver can switch to the manual driving mode before the automatic driving prohibited zone with certainty that the notification from the vehicle is correct.

In the automatic driving permitted zone, the driver does not necessarily need to switch the driving mode to the automatic driving mode but may continue to run in the manual driving mode. In contrast, in the automatic driving prohibited zone, the running in the automatic driving mode is prohibited and thus the driver must be sure to switch to the manual driving mode. In this embodiment, providing a notification to announce beforehand the end of the automatic driving permitted zone allows the driver to prepare in advance, thereby preventing the driver from continuing to run in the automatic driving mode in the automatic driving prohibited zone.

(5e) In this embodiment, the control device 35 displays the captured image showing only the specific sign on the display device 33. Therefore, it is possible to display the captured image emphasizing the specific sign on the display device 33 as compared to a configuration in which a captured image of an area including part of the specific sign is displayed on the display device 33.

(5f) In this embodiment, the control device 35 displays the specific captured image that is a captured image showing the specific signpost as a still image on the display device 33. Therefore, the driver can recognize easily the specific signpost in the displayed captured image as compared to a configuration in which the specific captured image is displayed as a moving image. As a result, it is easy for the driver to check the specific signpost in the displayed image against the matter visually identified by the driver.

(5g) In this embodiment, the control device 35 displays the specific captured image on the display device 33. The control device 35 also causes the speaker 34 to output the sounds to make a notification. That is, in this embodiment, the notification in a mode different from the display of the specific captured image is made by outputting the sounds from the speaker 34. Therefore, the driver does not need to check visually a vehicle interior lamp, for example, as compared to a configuration in which the vehicle interior lamp is illuminated as a notification mode different from the display of the specific captured image. This allows the driver to recognize the notification without having to transfer the driver's gaze during the driving.

In this embodiment, the prohibition signpost 21, the start announcement signpost 22, the start signpost 23, the permission signpost 24, the end announcement signpost 25, and the end signpost 26 are equivalent to the specific signs. Specifically, the start announcement signpost 22 is equivalent to the start announcement sign, the start signpost 23 is equivalent to the start sign, the end announcement signpost 25 is equivalent to the end announcement sign, and the end signpost 26 is equivalent to the end sign. In addition, the control device 35 is equivalent to the notification processing device, S15, S227, and S257 are equivalent to the operations of the image acquisition unit, and S16, S228, and S258 are equivalent to the operations of the recognition unit. S20, S21, S23, S24, S221, and S251 are equivalent to the operations of the first notification processing unit and the second notification processing unit.

6. Other Embodiments

An embodiment for carrying out the present disclosure has been described so far. However, the present disclosure is not limited to the foregoing embodiment but can be carried out in various modified manners.

(6a) In the foregoing embodiment, the specific signposts 21 to 26 are taken as specific signs. However, the specific signs are not limited to them. For example, the specific signs may be specific road markings drawn on road surfaces. In addition, the control device may recognize either or both of the specific signposts and the specific road markings, for example.

(6b) In this embodiment, the control device 35 extracts the portion showing the specific signpost from the captured image. Then, the control device 35 enlarges and displays the cut image as the captured image showing only the specific signpost. However, the method for displaying the captured image showing only the specific signpost is not limited to this. For example, the control device may display the cut image so as not to fill the display screen of the display device 33. In other words, the control device may display the cut image such that the display screen has a portion not showing the cut image.

In the case of displaying the captured image showing only the specific signpost as the specific captured image, the control device 35 may also display a specific capturing position as a capturing position of the specific captured image in a map on the display device 33.

Figure 8:
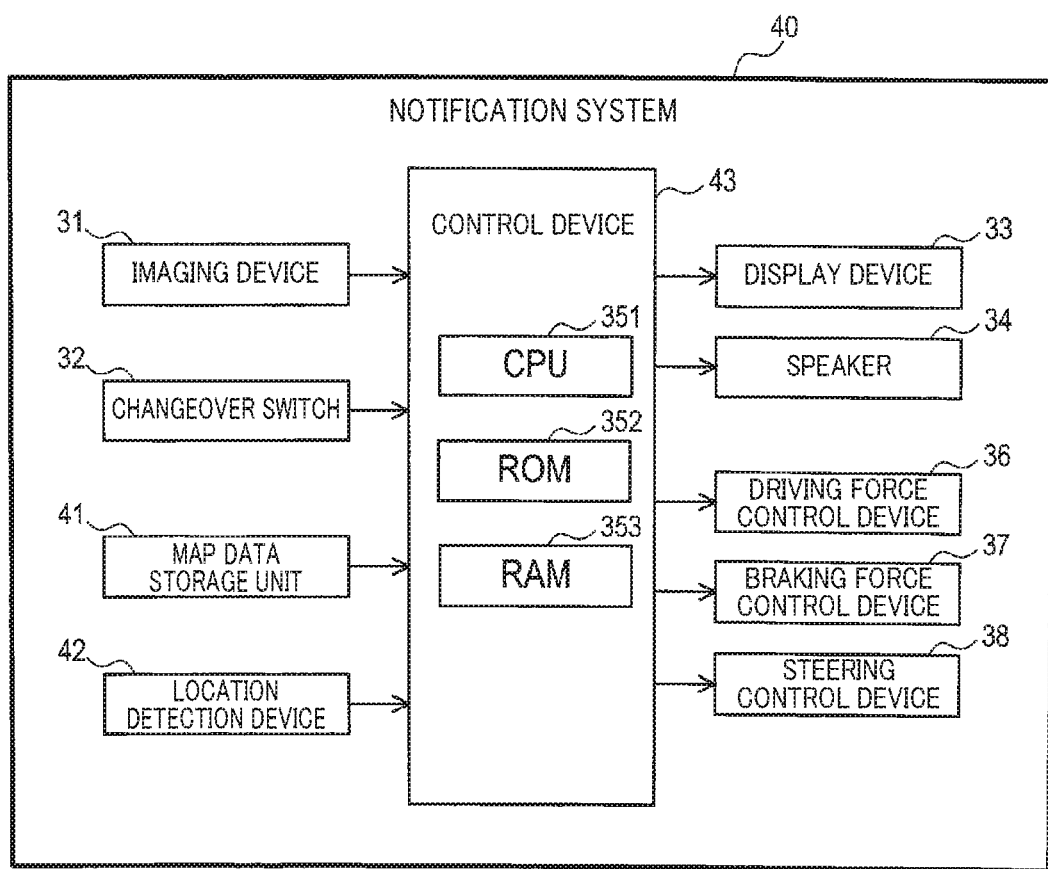
FIG. 8 is a block diagram illustrating a configuration of a notification system according to another embodiment.

Specifically, a notification system 40 illustrated in FIG. 8 is assumed. The notification system 40 is different from the notification system 30 described above and is further including a map data storage unit 41 and a position detection device 42. The notification system 40 is also different from the notification system 30 in including a control device 43 instead of the control device 35.

The map data storage unit 41 is a device that can store map data. The map data here refers to various kinds of data that is necessary for displaying a map on the display device 33. The map data includes the data on links indicating the shapes of roads and the data on the positions of nodes at both ends of the links. The map data also includes the data indicating the types of the roads formed by the links, road widths, the numbers of lanes, and the like, and the data on buildings and geographic features.

The position detection device 42 is a device that can detect the current position of the vehicle 1.

The control device 43 is the same in hardware configuration as the control device 35 but executes a process different from that executed by the control device 35. The control device 43 executes a notification process described in FIG. 9.

Figure 9:
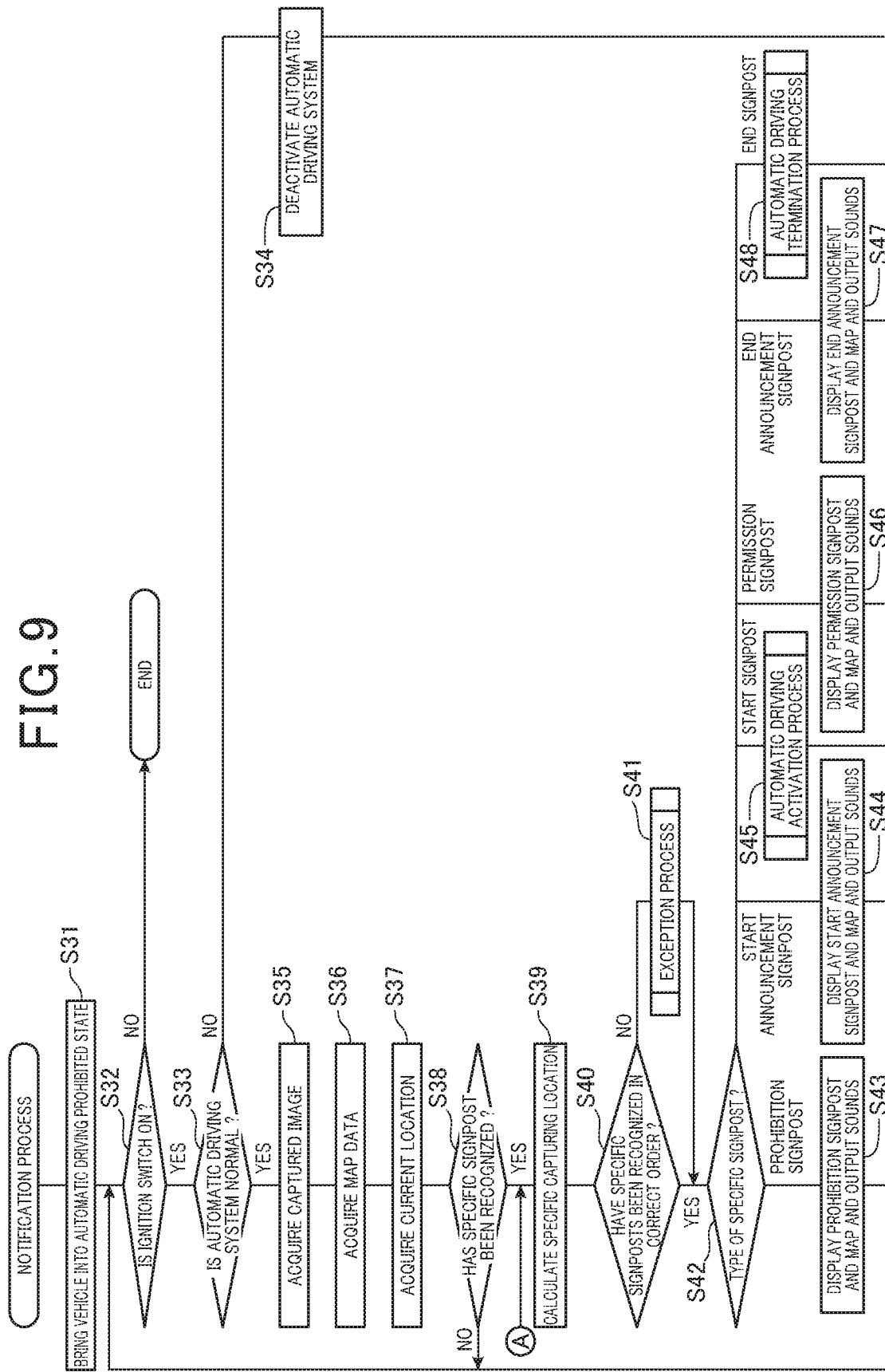
FIG. 9 is a flowchart of a notification process according to the other embodiment.

The notification process will be described with reference to FIG. 9.

S31 to S35 are respectively similar to S11 to S15 of the notification process described above with reference to FIG. 4 and thus descriptions thereof will be omitted.

In S36, the control device 43 acquires map data from the map data storage unit 41.

In S37, the control device 43 acquires the current position of the vehicle 1 from the position detection device 42.

S38 is similar to S16 of the notification process described above with reference to FIG. 4 and thus descriptions thereof will be omitted.

In S39, the control device 43 calculates the specific capturing position based on the map data acquired in S36 and the current position of the vehicle 1 acquired in S37.

S40 to S42 are similar to S17 to S19 of the notification process described above with reference to FIG. 4 and thus descriptions thereof will be omitted.

In S43, the control device 43 displays on the display device 33 the prohibited captured image and the map representing the specific capturing position of the prohibition captured image in a recognizable manner, based on the map data acquired in S36 and the specific capturing position calculated in S39. The control device 43 also causes the speaker 34 to output the sounds indicating that the vehicle 1 is positioned in the automatic driving prohibited zone. In S44 to S48 as well as S43, the control device 43 displays on the display device 33 the specific captured image and the map representing the specific capturing position of the specific captured image in a recognizable manner.

According to this configuration, the driver can more easily check the displayed specific captured image against the matter visually identified by the driver as compared to the configuration in which only the specific captured image is displayed on the display device 33.

In this example, the control device 43 is equivalent to the notification processing device. S35 is equivalent to the operation of the image acquisition unit, and S36 is equivalent to the operation of the map data acquisition unit. S38 is equivalent to the operation of the recognition unit, and S39 is equivalent to the operation of the calculation unit. S43, S44, S46, and S47 are equivalent to the operations of the first notification processing unit and the second notification processing unit.

Figure 10:
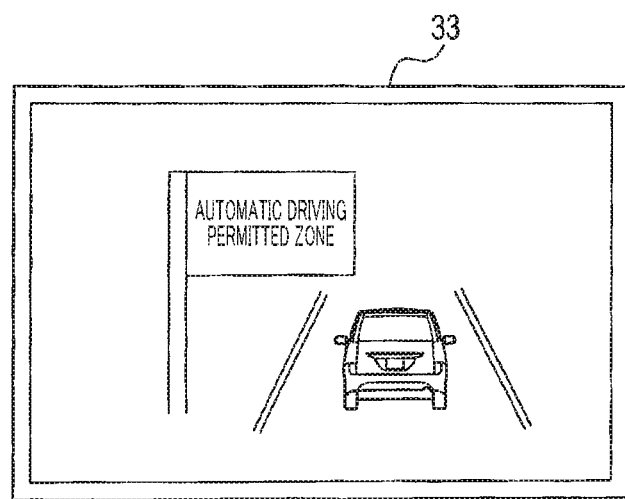
FIG. 10 is a diagram illustrating a captured image of an area partly including a specific sign.

(6c) In the foregoing embodiment, the captured image showing only the specific signpost is displayed as the specific captured image, but the display mode is not limited to this. For example, the control device may display the captured image of an area partly including the specific signpost on the display device 33, more generally, the specific sign as the specific captured image, as illustrated in FIG. 10. According to this configuration, objects other than the specific sign (for example, surrounding landscapes, roads, other vehicles, accompaniments to roads, and the like) are displayed together with the specific sign. Thus, the driver can more easily check the displayed image against the matter visually identified by the driver as compared to the configuration in which the captured image showing only the specific sign is displayed as the specific captured image.

In addition to the specific captured image, the display device 33 may display the current position of the vehicle 1, the specific capturing position of the displayed specific captured image, the images of kilo posts captured in the vicinity of the current position of the vehicle 1, and the images of kilo posts captured in the vicinity of the specific capturing position. Other than the specific captured image, the display device 33 may display the current time and the time when the specific captured image was captured.

The foregoing items may be displayed both in the case where the captured image showing only the specific sign is displayed and in the case where the captured image of an area including part of the specific sign is displayed.

The mode in which to display the captured image showing only the specific sign and the mode in which to display the captured image of an area including part of the specific sign may be switchable by the driver's operation.

(6d) In the foregoing embodiment, the control device 35 displays the specific captured image as a still image on the display device 33, but the display mode is not limited to this. The control device may display the specific captured image as a moving image, for example.

(6e) In the foregoing embodiment, the control device 35 makes a notification in a notification mode different from the display of the specific captured image, by causing the speaker 34 to output the voice message, but the notification is not limited to this. The control device may make a notification, for example, by causing the speaker 34 to output sounds other than the voice message.

The control device may make a notification, for example, by displaying an image other than the specific captured image (for example, icon or the like) on the display device 33, vibrating a device in the vehicle interior, or illuminating the interior lamp.

(6f) In the foregoing embodiment, when the specific signposts 21 to 26 are recognized in the captured image, a notification is made to allow the driver to determine whether the vehicle 1 is positioned in the automatic driving prohibited zone or the automatic driving permitted zone. However, the method for zone determination is not limited to this. For example, the determination may be made in a manner as described below in addition to the determination based on the specific signposts 21 to 26.

That is, the control device further executes a process of acquiring map data including position information in the automatic driving prohibited zone and the automatic driving permitted zone, and a process of acquiring the current position of the vehicle. Then, the control device may determine whether the vehicle is positioned in the automatic driving prohibited zone or the automatic driving permitted zone based on the acquired information and make a notification of the determination result via the speaker 34 or the like. According to this configuration, even in the zone where the specific signposts 21 to 26 are not recognized, the driver can determine whether the vehicle 1 is positioned in the automatic driving prohibited zone or the automatic driving permitted zone.

(6g) In the foregoing embodiment, the automatic driving mode is a driving mode in which the automatic driving control is executed to automatically perform acceleration, braking, and steering among the driver's driving operations, but the automatic driving mode is not limited to this. For example, the automatic driving mode may be a driving mode in which any operation other than acceleration, braking, and steering is automatically performed as well as acceleration, braking, and steering. In this case, for example, the automatic driving mode may be a driving mode in which a fully automatic driving control is executed to automatically perform all the driver's driving operations.

(6h) In the foregoing embodiment, some or all of the functions executed by the control device 35 may be configured hardware-wise by one or more ICs or the like.

(6i) The functions of one component in the foregoing embodiment may be distributed among a plurality of components, or the functions of a plurality of components in the foregoing embodiment may be integrated into one component. Some of the components in the foregoing embodiment may be omitted. At least some of the components in the foregoing embodiment may be added to or replaced by other components in the foregoing embodiment. All modes included in the technical idea specified only by the text of the claims constitute embodiments of the present disclosure.

(6j) Other than the control device 35, the present disclosure can be implemented in various modes such as the notification system 30 including the control device 35 as a component, a program for causing a computer to serve as the control device 35, a non-transitory tangible storage medium such as a semiconductor memory storing the program, and a notification method by which to display the specific captured image on the display device 33.

The invention claimed is:

1. A notification processing device for providing a notification to a driver, which is used in a vehicle equipped with an imaging device that captures an area ahead of the vehicle and a display device, the vehicle is capable of running in an automatic driving mode in which an automatic driving control is executed to automatically perform at least acceleration, braking, and steering, and a manual driving mode in which no automatic driving control is executed, the notification processing device comprising:
   an image acquisition unit that acquires, using a processor, a captured image from the imaging device;
   a recognition unit that recognizes, using the processor, an end announcement sign that is a sign announcing beforehand an end of a zone where running in the automatic driving mode is permitted in the captured image acquired by the image acquisition unit from the captured image acquired by the image acquisition unit;
   a first notification processing unit that notifies, using the processor, the driver by displaying the end announcement sign on the display device in response to the recognition unit recognizing the end announcement sign; and
   a second notification processing unit notifies, using the processor, the end of the zone where running in the automatic driving mode is permitted in a notification mode different from the display of the first notification processing unit in response to the recognition unit recognizing the end announcement sign.

2. A computer-implemented method for providing a notification to a driver, which is used in a vehicle equipped with an imaging device that captures an area ahead of the vehicle and a display device, the vehicle is capable of running in an automatic driving mode in which an automatic driving control is executed to automatically perform at least acceleration, braking, and steering, and a manual driving mode in which no automatic driving control is executed, the method comprising:
   acquiring a captured image from the imaging device;
   recognizing an end announcement sign that is a sign announcing beforehand an end of a zone where running in the automatic driving mode is permitted in the captured image;
   notifying the driver by displaying the end announcement sign on the display device, in response to the end announcement sign being recognized; and
   notifying the end of the zone where running in the automatic driving mode is permitted in a notification mode different from the displaying of the end announcement sign, in response to the end announcement sign being recognized.

* * * * *